US007788915B2

(12) United States Patent

Shiozaki et al.

(10) Patent No.: US 7,788,915 B2

(45) Date of Patent: Sep. 7, 2010

(54) HYDRAULIC CIRCUIT

(75) Inventors: Shuuji Shiozaki, Osaka (JP); Hiroshi Matsuyama, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 583 days.

(21) Appl. No.: 11/793,543

(22) PCT Filed: Aug. 29, 2005

(86) PCT No.: PCT/JP2005/015652

§ 371 (c)(1), (2), (4) Date: Sep. 28, 2007

(87) PCT Pub. No.: WO2006/067892

PCT Pub. Date: Jun. 29, 2006

(65) Prior Publication Data

US 2008/0104952 A1 May 8, 2008

(30) Foreign Application Priority Data

Dec. 21, 2004 (JP) ............................ 2004-369026

(51) Int. Cl.
*F16D 31/02* (2006.01)

(52) U.S. Cl. .......................................... 60/413; 60/452

(58) Field of Classification Search .................. 60/413, 60/452, 468

See application file for complete search history.

(56) References Cited

U.S. PATENT DOCUMENTS 5,613,361 A * 3/1997 Dantlgraber et al. .......... 60/427
5,865,028 A 2/1999 Klauck et al.
2002/0189250 A1 12/2002 Brunn

FOREIGN PATENT DOCUMENTS

| | | |
|---|---|---|
| JP | 57-116907 | 7/1982 |
| JP | 59-138600 | 8/1984 |
| JP | 60-049103 | 3/1985 |
| JP | 62-177303 | 8/1987 |
| JP | 2000 257712 | 9/2000 |
| JP | 2001 295813 | 10/2001 |
| JP | 2004-003652 | 1/2004 |

OTHER PUBLICATIONS

Microfilm of the specification and drawings annexed to the request of Japanese Utility Model Application No. 98855/1983 (Laid-open No. 7401/1985), Komatsu Ltd., Jan. 19, 1985, Figs. 1, 3.

* cited by examiner

*Primary Examiner*—F. Daniel Lopez
(74) *Attorney, Agent, or Firm*—Sterne, Kessler, Goldstein & Fox P.L.L.C.

(57) ABSTRACT

A hydraulic circuit 100 having a simple structure can recover energy of fluid. Hydraulic circuit 100 comprises a boom cylinder 22, a hydraulic pump 31, a motion switchover valve 32, a hydraulic pressure regulation system 37 and a recovery pipe 36. Hydraulic pump 31 is driven by a drive source 15 so as to deliver fluid to boom cylinder 22. Motion switchover valve 32 is disposed between boom cylinder 22 and hydraulic pump 31 so as to switch a motion of boom cylinder 22. Hydraulic pressure regulation system 37 adjusts a differential pressure of motion switchover valve 32 between a delivery port 31*a* of hydraulic pump 31 and a suction port of boom cylinder 22 to a predetermined value. Recovery pipe 36 supplies hydraulic pump 31 with fluid from motion switchover valve 32 to which the fluid is drained from a drain port of boom cylinder 22.

3 Claims, 11 Drawing Sheets

Torque (N·m): Tact(n)={Tidl(n)+(Tmax(n)−Tidl(n)) × Y(n)/100}

Load Factor (%): Y(n)=100 × (Tact(n)−Tidl(n))/(Tmax(n)−Tidl(n))

Limit Torque (N·m): Tlim(n)={Tidl(n)+(Tmax(n)−Tidl(n)) × Ylim/100}

Rack Position (mm): $Ract(n)=\{Ridl(n)+(Rmax(n)-Ridl(n))\times Z(n)/100\}$

Load Factor (%): $Z(n)=100\times(Ract(n)-Ridl(n))/(Rmax(n)-Ridl(n))$

Limit Rack Position (mm): $Rlim(n)=\{Ridl(n)+(Rmax(n)-Ridl(n))\times Zlim/100\}$

HYDRAULIC CIRCUIT

TECHNICAL FIELD

The present invention relates to a hydraulic circuit. Especially, the present invention relates to a technology for recovering energy of fluid circulating in the hydraulic circuit.

BACKGROUND ART

Conventionally, there is a well-known hydraulic circuit including a hydraulic cylinder, a hydraulic pump driven by a drive source so as to deliver fluid to the hydraulic cylinder, and a motion switchover valve disposed between the hydraulic cylinder and the hydraulic pump so as to switch a motion of the hydraulic cylinder.

In the typical hydraulic circuit, generally, the motion switchover valve determines a direction of fluid delivered from the hydraulic pump so as to selectively supply the fluid to either a bottom chamber of the hydraulic cylinder or a rod chamber of the hydraulic cylinder, thereby extending or contracting the hydraulic cylinder. In this hydraulic circuit, when one of the bottom or rod chambers of the hydraulic cylinder is supplied with fluid, fluid is drained from the other of the bottom and rod chambers and is returned to a fluid tank through a return pipe. The hydraulic pump sucks fluid from the fluid tank.

Further, conventionally, as disclosed in JP 2000-257712A, a kind of the hydraulic circuit has a function referred to as "load sensing function." The load sensing function is defined as a function to adjust a differential pressure of the motion switchover valve between a delivery port of the hydraulic pump and a suction port of the hydraulic actuator into a predetermined range so as to keep a substantially constant flow quantity of fluid supplied to the hydraulic actuator (i.e., to keep a substantially constant motion speed of the hydraulic actuator) regardless of variation of load applied on the hydraulic actuator.

Further, conventionally, as disclosed in JP 2001-207482A, a hydraulic circuit includes a hydraulic motor, a generator and a battery, so as to have a function referred to as "energy recovery function". The hydraulic motor is disposed on an intermediate portion of the return pipe so as to be driven by fluid flowing in the return pipe. The generator is driven by the hydraulic motor and is connected to the battery. The energy recovery function is defined as a function to recover electric energy into which energy (kinetic energy and potential energy) of fluid flowing in the return pipe is converted.

DISCLOSURE OF THE INVENTION

Problems to Be Solved by the Invention

However, the conventional hydraulic circuit including the hydraulic cylinder controlled according to the load sensing function does not recover energy.

The conventional hydraulic circuit having the energy recovery function requires the hydraulic motor, the generator, the battery and others for achieving the energy recovery function, thereby increasing manufacturing costs.

Further, the components for the energy recovery function, such as the hydraulic motor, the generator and the battery, are additionally provided to the hydraulic circuit so as to complicate and expand the hydraulic circuit.

An object of the invention is to provide a simple hydraulic circuit having the capacity of recovering energy of fluid.

Means for Solving the Problems

The problems to be solved by the invention have been mentioned above. Means for solving the problems will now be described.

As claimed in claim 1, a hydraulic circuit comprises: a first hydraulic actuator; a first hydraulic pump driven by a drive source so as to deliver fluid to the first hydraulic actuator; a motion switchover valve disposed between the first hydraulic actuator and the first hydraulic pump so as to switch a motion of the first hydraulic actuator; a hydraulic pressure regulation system for adjusting a differential pressure of the motion switchover valve between a delivery port of the first hydraulic pump and a suction port of the first hydraulic actuator to a predetermined value; at least one second hydraulic actuator; a second hydraulic pump driven by the drive source so as to deliver fluid to the at least one second hydraulic actuator; and a recovery passage for supplying the first hydraulic pump with fluid from the motion switchover valve to which the fluid is returned from a drain port of the first hydraulic actuator, so that the second hydraulic pump is driven by the fluid from the recovery passage.

As claimed in claim 2, the first hydraulic actuator is a single-rod type hydraulic cylinder, and the hydraulic circuit further comprises a connection system disposed between the hydraulic cylinder and the motion switchover valve so as to connect lower-pressurized one of bottom and rod chambers of the hydraulic cylinder to a fluid supply circuit or a fluid drain pipe.

As claimed in claim 3, the hydraulic circuit further comprises a delivery restriction system for restricting delivery quantities of the first and second hydraulic pumps when load on the drive source becomes not less than a predetermined value.

Effects of the Invention

The invention has the following effects.

According to claim 1, the hydraulic circuit, having a simple structure, is able to recover energy of fluid returned from the hydraulic cylinder and to provide the energy of driving the first hydraulic pump for driving the second hydraulic pump. The hydraulic cylinder driven by fluid delivered from the hydraulic pump can move at a substantially constant speed regardless of variation of load.

According to claim 2, although the hydraulic cylinder is the single-rod type hydraulic cylinder, the hydraulic circuit can be prevented from having unevenly distributed fluid.

According to claim 3, the hydraulic actuator driven by fluid delivered from the second hydraulic pump can be moved at a substantially constant speed regardless of variation of load, and the drive source can be prevented from being overloaded.

DESCRIPTION OF NOTATIONS

15 Engine (Drive Source)
22 Boom Cylinder (Hydraulic Cylinder)
31 Hydraulic Pump
32 Motion Switchover Valve
36 Recovery Pipe
37 Pressure Regulation System
100 Hydraulic Circuit

BEST MODE FOR CARRYING OUT THE INVENTION

Figure 1:
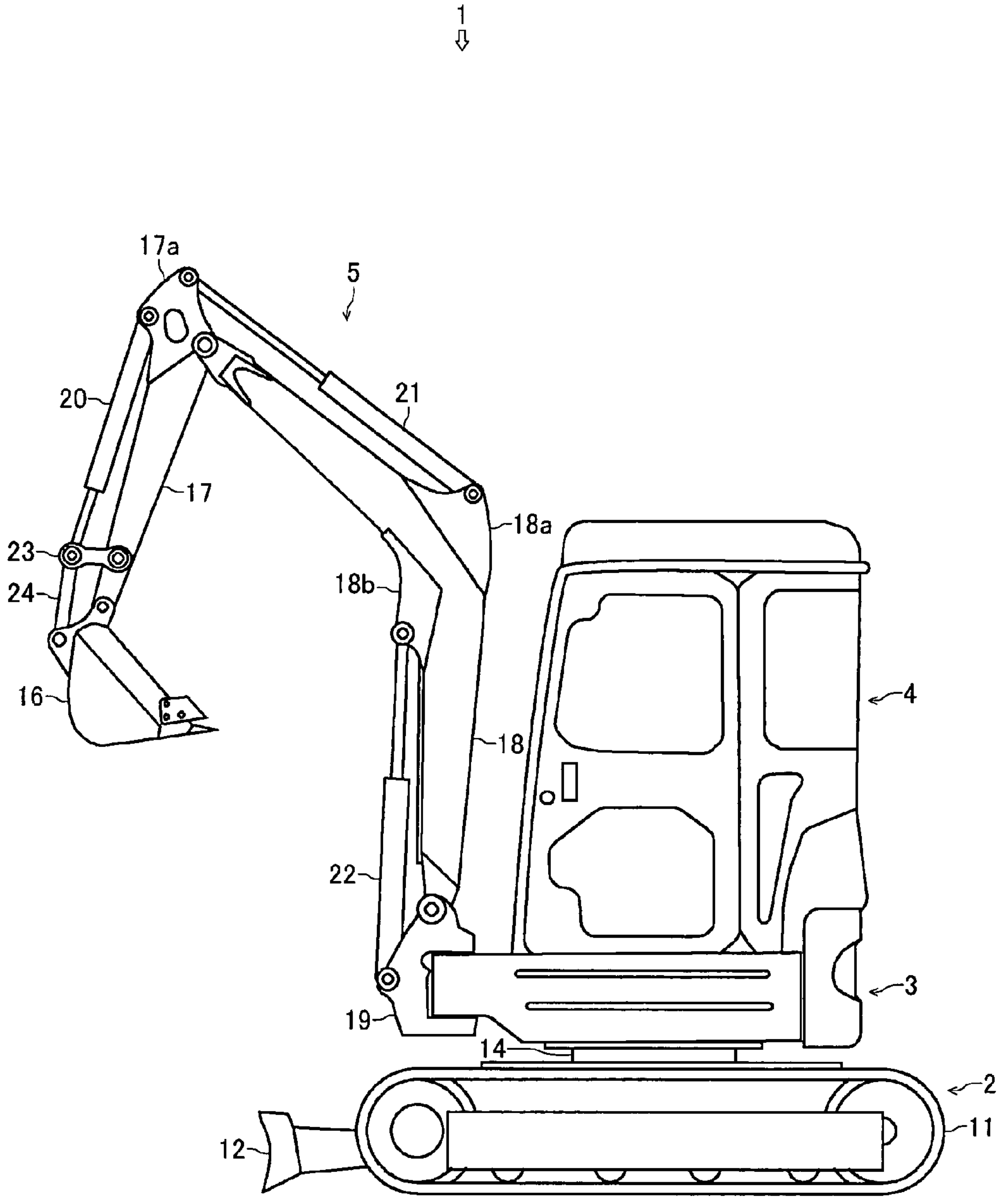
FIG. 1 is a left side view of a backhoe equipped with a hydraulic circuit according to the invention.
Figure 2:
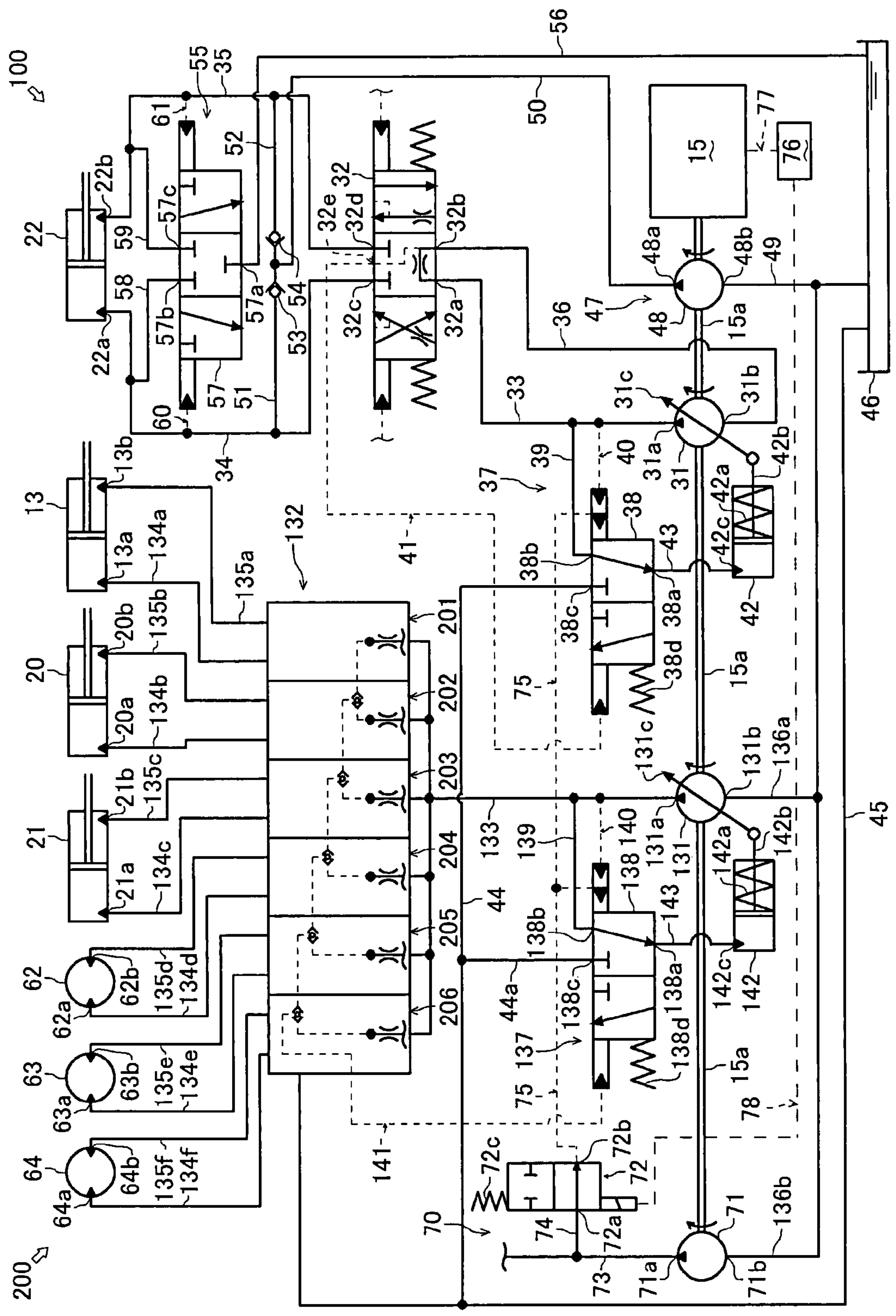
FIG. 2 is a diagram of the hydraulic circuit according to an embodiment of the invention.

Referring to FIGS. 1 and 2, an entire structure of a backhoe 1 serving as an embodiment of an excavator equipped with a hydraulic circuit according to the invention will be described.

The hydraulic circuit of the invention is broadly adaptable to a hydraulic cylinder and other hydraulic actuators. Therefore, the excavator of this embodiment is not limitative of an adaptable scope of the hydraulic circuit.

As shown in FIG. 1, backhoe 1 mainly includes a crawler-traveling device 2, a swivel frame 3, a cabin 4 and a working device 5.

Crawler-traveling device 2 serves as an understructure of backhoe 1, and is equipped with a pair of left and right crawlers 11 (only left crawler 11 is shown in FIG. 1).

In this embodiment, crawler-traveling device 2 is provided at a front portion thereof with a blade 12 and a blade cylinder 13 (shown in FIG. 2) which is a hydraulic cylinder for vertically rotating blade 12.

Swivel frame 3 serves as an upper structure, swivellably mounted on crawler-traveling device 2 through a swivel bearing 14.

Swivel frame 3 incorporates an engine 15 (shown in FIG. 2), serving as a drive source, and other members. Cabin 4 and working device 5 are provided on swivel frame 3.

Cabin 4 is disposed above swivel frame 3 so as to protect an operator operating backhoe 1 from wind, rain and the direct rays of the sun. An operator's seat and a group of levers (not shown) for various operations of backhoe 1 are disposed in cabin 4.

Working device 5 mainly includes a bucket 16, an arm 17, a boom 18, a boom bracket 19, a bucket cylinder 20, an arm cylinder 21, a boom cylinder 22 and the like, and is provided on a front portion of swivel frame 3 of backhoe 1.

Bucket 16 is an attachment for excavation, serving as a tip part of working device 5. Bucket 16 is pivoted at a base portion thereof onto a tip portion of arm 17.

Arm 17 is a rod-shaped member serving as a constitutional body of working device 5, and is pivoted at a base portion thereof onto a tip portion of boom 18.

Boom 18 is a member serving as a constitutional body. Boom 18 is bent at an intermediate portion thereof forward of the vehicle, and is pivoted at a base portion thereof onto boom bracket 19.

Boom bracket 19 is a member serving as a base part of working device 5, and is pivoted at a rear end portion thereof onto the front end portion of swivel frame 3.

Further, a swing cylinder (not shown) has a rod end portion thereof pivoted onto a right side portion of boom bracket 19, and has a cylinder end portion thereof onto swivel frame 3. The swing cylinder is a hydraulic cylinder for rotating working device 5 laterally relative to swivel frame 3.

Bucket cylinder 20 is a hydraulic cylinder for rotating bucket 16 relative to arm 17.

Bucket cylinder 20 is pivoted at a cylinder end thereof onto a bracket 17*a* provided on a base portion of arm 17, and is pivoted at a rod end portion thereof onto bucket 16 through links 23 and a rod 24.

Arm cylinder 21 is a hydraulic cylinder for rotating arm 17 relative to boom 18.

Boom 18 is provided with a bracket 18*a* on a surface of an intermediate portion thereof facing toward cabin 4. Arm cylinder 21 is pivoted at a cylinder end portion thereof onto bracket 18*a*, and is pivoted at a rod end portion thereof onto bracket 17*a*.

Boom cylinder 22 is a hydraulic cylinder for rotating boom 18 relative to swivel frame 3 (strictly, boom bracket 19).

Boom cylinder 22 is pivoted at a cylinder end portion thereof onto a front end portion of boom bracket 19. Boom 18 is provided with a bracket 18*b* on a surface of an intermediate portion thereof opposite to the surface on which bracket 18*a* is provided. Bracket boom cylinder 22 is pivoted at a rod end potion thereof onto bracket 18*b*.

Referring to FIG. 2, a structure of a hydraulic circuit 100, serving as an embodiment of a hydraulic circuit according to the present invention, will now be described.

Hydraulic circuit 100 is provided to backhoe 1 shown in FIG. 1. As shown in FIG. 2, hydraulic circuit 100 mainly includes boom cylinder 22, a hydraulic pump 31, a motion switchover valve 32, a delivery pipe 33, pipes 34 and 35, a recovery pipe 36, a hydraulic pressure regulation system 37, a fluid supply circuit 47 and a connection system 55.

As mentioned above, boom cylinder 22 is the hydraulic cylinder for rotating boom 18 relative to swivel frame 3 (strictly, boom bracket 19).

The fluid-recoverable hydraulic circuit having the load-sensing function according to the invention will be described with reference to boom cylinder 22.

Boom cylinder 22 includes a cylinder member, a cylinder rod, and a piston. The cylinder member has an inner space, and the cylinder rod is inserted into the inner space of the cylinder member through one end of the cylinder member. The piston is fixed to one end of the cylinder rod in the inner space of the cylinder member.

The inner space of the cylinder member is provided around the one end of the cylinder rod. The piston is air-tightly and slidably fitted to an inner peripheral surface of the cylinder member, and divides the inner space into a bottom chamber and a rod chamber.

The bottom chamber is defined as a space toward a bottom portion of the cylinder member, i.e., an end portion of the cylinder member from which the cylinder rod does not project. The rod chamber is defined as a space toward a tip portion of the cylinder member, i.e., an end portion of the cylinder member from which the cylinder rod projects.

The cylinder member of boom cylinder 22 is provided on an outer peripheral surface thereof with a cylinder port 22*a* serving as an opening between the bottom chamber and the outside, and with a cylinder port 22*b* serving as an opening between the rod chamber and the outside.

When boom cylinder 22 is extended, fluid is supplied to the bottom chamber, and is drained from the rod chamber, so that cylinder port 22*a* on the bottom chamber side serves as a suction port, and cylinder port 22*b* on the rod chamber side serves as a drain port.

When boom cylinder 22 is contracted, fluid is supplied to the rod chamber, and drained from the bottom chamber, so that cylinder port 22*b* on the rod chamber side serves as the suction port, and cylinder port 22*a* on the bottom chamber side serves as the drain port.

Boom cylinder 22 of this embodiment is the hydraulic cylinder having the rod projecting outward from the cylinder, i.e., the single-rod type hydraulic cylinder. Alternatively, the hydraulic circuit of the invention is adaptable to a hydraulic cylinder having rods projecting from opposite ends of the cylinder, i.e., a double-rod type hydraulic cylinder.

Hydraulic pump 31 is provided to deliver fluid to boom cylinder 22, and is driven by engine 15 serving as a drive source.

Hydraulic pump 31 of the present embodiment includes a delivery port 31*a*, serving as an opening for delivering fluid, and a suction port 31*b*, serving as an opening for sucking fluid.

Hydraulic pump 31 is a swash plate type axial piston pump having a swash plate 31*c* rotatably fitted to a casing. An angle of a surface of swash plate 31*c* from an axial line of a rotary shaft 15*a* is changed so as to change a delivery quantity of fluid from hydraulic pump 31 per one rotation of rotary shaft 15*a*, thereby changing the delivery quantity of fluid therefrom per unit time.

Alternatively, an electric motor or any one may serve as the drive source only if it can drive hydraulic pump 31.

In the embodiment, hydraulic pump 31 is the axial piston pump. Alternatively, any variable displacement hydraulic pump having another structure is adaptable only if it can change its delivery quantity of fluid per one rotation of rotary shaft 15*a*.

Motion switchover valve 32 is disposed between boom cylinder 22 and hydraulic pump 31 so as to switch a route of flow of fluid delivered from hydraulic pump 31 to boom cylinder 22, thereby switching the motion of boom cylinder 22.

In this embodiment, motion switchover valve 32 includes four ports, i.e., first side ports 32*a* and 32*b* and second side ports 32*c* and 32*d*. Motion switchover valve 32 is provided therein with a spool which is slidable for switching the route of fluid flow, i.e., for selecting one of valve states A, B and C. State A is a neutral state where ports 32*a* and 32*b* are opened to each other, and ports 32*c* and 32*d* are closed. State B is a cylinder-extension state where ports 32*a* and 32*c* are opened to each other, and ports 32*b* and 32*d* are opened to each other. State C is a cylinder-contraction state where ports 32*a* and 32*d* are opened to each other, and ports 32*b* and 32*c* are opened to each other.

Delivery pipe 33 connects delivery port 31*a* of hydraulic pump 31 to port 32*a* of motion switchover valve 32, so as to supply the fluid delivered from hydraulic pump 31 to motion switchover valve 32.

Pipe 34 connects port 32*c* of motion switchover valve 32 to cylinder port 22*a* of boom cylinder 22 on the bottom chamber side.

Pipe 35 connects port 32*d* of motion switchover valve 32 to cylinder port 22*b* of boom cylinder 22 on the rod chamber side.

Recovery pipe 36 supplies hydraulic pump 31 with fluid from motion switchover valve 32 to which the fluid is returned from the drain port of boom cylinder 22.

When motion switchover valve 32 is set in neutral state A, ports 32*a* and 32*b* are connected to each other, so that the fluid delivered from hydraulic pump 31 is supplied to hydraulic pump 31 through delivery pipe 33, motion switchover valve 32 and recovery pipe 36.

Simultaneously, ports 32*c* and 32*d* are closed so as to keep the fluid filled in the bottom and rod chambers of boom cylinder 22.

Consequently, the projection degree of the cylinder rod of boom cylinder 22 from the cylinder member, i.e., the length of boom cylinder 22, is kept.

When motion switchover valve 32 is set in cylinder-extension state B, ports 32*a* and 32*c* are connected to each other, so that the fluid delivered from hydraulic pump 31 is supplied to the bottom chamber of boom cylinder 22 through delivery pipe 33, motion switchover valve 32 and pipe 34.

Simultaneously, ports 32*b* and 32*d* are connected to each other, so that the fluid having been filled in the rod chamber of boom cylinder 22 is supplied to hydraulic pump 31 through pipe 35, motion switchover valve 32 and recovery pipe 36.

Consequently, the cylinder rod of boom cylinder 22 is thrust out from the cylinder member, i.e., boom cylinder 22 is extended.

When motion switchover valve 32 is set in cylinder-contraction state C, ports 32*a* and 32*d* are connected to each other, so that the fluid delivered from hydraulic pump 31 is supplied to the rod chamber of boom cylinder 22 through delivery pipe 33, motion switchover valve 32 and pipe 35.

Simultaneously, ports 32*b* and 32*c* are connected to each other, so that the fluid having been filled in the bottom chamber of boom cylinder 22 is supplied to hydraulic pump 31 through pipe 34, motion switchover valve 32 and recovery pipe 36.

Consequently, the cylinder rod of boom cylinder 22 is withdrawn into the cylinder member, i.e., boom cylinder 22 is contracted.

Referring to FIG. 2, a structure of hydraulic pressure regulation system 37 will now be described.

Hydraulic pressure regulation system 37 adjusts a differential pressure ΔP of motion switchover valve 32 between a pressure P1 of delivery port 31*a* of hydraulic pump 31 and a pressure P2 of the suction port of boom cylinder 22 to a predetermined value.

In this embodiment, hydraulic pressure regulation system 37 includes a pressure regulation valve 38, a pipe 39, pilot pipes 40 and 41, a regulating cylinder 42, a pipe 43 and return pipes 44 and 45.

Pressure regulation valve 38 is a pilot type switchover valve which switches a route of fluid flow therein due to the differential pressure of motion switchover valve 32 between the pressure of delivery port 31*a* of hydraulic pump 31 (i.e., the pressure of delivery pipe 33) and the pressure of the suction port of boom cylinder 22 (i.e., the pressure of pipe 34 during extension of boom cylinder 22, or pipe 35 during contraction of boom cylinder 22).

In the present embodiment, pressure regulation valve 38 includes three ports 38*a*, 38*b* and 38*c*, and is provided therein with a spool, which is slidable for switching the route of fluid flow in pressure regulation valve 38 so as to select either a valve state A(a), where ports 38*a* and 38*b* are opened to each other and port 38*c* is closed, or a valve state B(b), where ports 38*a* and 38*c* are opened to each other and port 38*b* is closed.

The spool of pressure regulation valve 38 is connected at opposite ends thereof to respective pilot pipes 40 and 41.

Pipe 39 connects port 38*b* of pressure regulation valve 38 to an intermediate portion of delivery pipe 33.

Pilot pipe 40 connects one end of a spool operation part in pressure regulation valve 38 to an intermediate portion of delivery pipe 33.

Therefore, the pressure of pilot pipe 40 (strictly, the pressure of fluid in pilot pipe 40) is substantially equal to the pressure of delivery pipe 33, i.e., to pressure P1 of delivery port 31 a of hydraulic pump 31.

Pilot pipe 41 connects, via port 32*e*, the other end of the spool operation part in pressure regulation valve 38 to an intermediate portion of a passage in motion switchover valve 32 between port 32*a* and another port (one of ports 32*b*, 32*c* and 32*d*).

Therefore, the pressure of pilot pipe 41 (strictly, the pressure of fluid in pilot pipe 41) is substantially equal to the pressure of pipe 34 when motion switchover valve 32 is set in cylinder-extension state B, or it is substantially equal to the pressure of pipe 35 when motion switchover valve 32 is set in cylinder-contraction state C. Consequently, the pressure of pilot pipe 41 is substantially equal to pressure P2 of the suction port of boom cylinder 22.

Further, when motion switchover valve 32 is set in neutral state A, the pressure of pilot pipe 41 is substantially equal to the pressure of recovery pipe 36, i.e., to the pressure of suction port 31*b* of hydraulic pump 31.

Regulating cylinder 42 is a single motion type hydraulic cylinder, in which a spring 42*a* biases a cylinder rod 42*b* into a cylinder member of regulation cylinder 42. The cylinder member of regulating cylinder 42 is provided on an outer peripheral surface thereof with a cylinder port 42*c* serving as an opening between its bottom chamber and the outside.

Cylinder rod 42*b* is connected at a tip thereof to swash plate 31*c* of hydraulic pump 31, so that the angle of the surface of swash plate 31*c* of hydraulic pump 31 from the axial line of rotary shaft 15*a* varies according to extension and contraction of regulating cylinder 42.

Pipe 43 connects port 38*a* of pressure regulation valve 38 to cylinder port 42*c* of regulating cylinder 42.

Return pipe 44 connects port 38*c* of pressure regulation valve 38 to an intermediate portion of return pipe 45.

Return pipe 45 is connected at one end thereof to a later-discussed motion switchover valve unit 132, and is disposed at the other end thereof in a fluid tank 46, in which fluid is stored.

Referring to FIG. 2, actuation processes of hydraulic pressure regulation system 37 will now be described.

Pilot pipe 40 is connected to one end of the spool operation part in pressure regulation valve 38, and pilot pipe 41 is connected to the other end of the spool operation part in pressure regulation valve 38, so that the spool is slidable due to the differential pressure between pilot pipes 40 and 41. A spring 38*d* biases the spool in the direction of slide of the spool caused by the pressure of pilot pipe 41.

When differential pressure ΔP (=P1−P2) between pressure P1 of delivery port 31*a* of hydraulic pump 31 and pressure P2 of the suction port of boom cylinder 22 becomes larger than the “predetermined value”, the force pushing the spool caused by the pressure of pilot pipe 40 exceeds the force pushing the spool caused by spring 38*d* and the pressure of pilot pipe 41, thereby sliding the spool in pressure regulation valve 38 so as to set pressure regulation valve 38 into state A(a).

When differential pressure ΔP (=P1−P2) between pressure P1 of delivery port 31*a* of hydraulic pump 31 and pressure P2 of the suction port of boom cylinder 22 becomes smaller than the “predetermined value,” the force pushing the spool caused by the pressure of pilot pipe 40 becomes smaller than the force pushing the spool caused by spring 38*d* and the pressure of pilot pipe 40, thereby sliding the spool in pressure regulation valve 38 so as to set pressure regulation valve 38 into state B(b).

As mentioned above, the force of spring 38*d* for pushing the spool corresponds to the “predetermined value.”

Thus, the “predetermined value” can be adjusted by adjusting a spring constant of spring 38*d*.

When pressure regulation valve 38 is set in state A(a), ports 38*a* and 38*b* are opened to each other so that a part of fluid in delivery pipe 33 is supplied to the bottom chamber of regulating cylinder 42 through pipe 39, pressure regulation valve 38 and pipe 43.

Consequently, regulating cylinder 42 is extended, so that swash plate 31*c* of hydraulic pump 31 rotates to move the surface thereof toward a position perpendicular to the axial line of rotary shaft 15*a*, i.e., to reduce the delivery quantity of fluid from hydraulic pump 31 per unit time.

As the delivery quantity of fluid from hydraulic pump 31 per unit time is reduced, differential pressure ΔP between pressure P1 of delivery port 31*a* of hydraulic pump 31 and pressure P2 of the suction port of boom cylinder 22 is reduced.

When pressure regulation valve 38 is set in state B(b), ports 38*a* and 38*c* are opened to each other so that fluid having been filled in the bottom chamber of regulating cylinder 42 is returned to fluid tank 46 through pipe 43, pressure regulation valve 38 and return pipes 44 and 45.

Consequently, regulating cylinder 42 is contracted, so that swash plate 31*c* of hydraulic pump 31 rotates to move the surface thereof toward a position parallel to the axial line of rotary shaft 15*a*, i.e., to increase the delivery quantity of fluid from hydraulic pump 31 per unit time.

As the delivery quantity of fluid from hydraulic pump 31 per unit time is increased, differential pressure ΔP between pressure P1 of delivery port 31*a* of hydraulic pump 31 and pressure P2 of the suction port of boom cylinder 22 is increased.

Since hydraulic pressure regulation system 37 actuates as mentioned above, differential pressure ΔP between pressure P1 of delivery port 31*a* of hydraulic pump 31 and pressure P2 of the suction port of boom cylinder 22 is adjusted to the predetermined value.

A speed of either extension or contraction of boom cylinder 22 varies in proportion to a flow quantity Q of fluid supplied to either the bottom or rod chamber of boom cylinder 22. A throttle is provided on an intermediate portion of the fluid delivery passage (in this embodiment, the passage from hydraulic pump 31 to the bottom or rod chamber of boom cylinder 22 through motion switchover valve 32). If pressure difference ΔP exists between the upstream and downstream sides of the throttle, the following formula (1) is realized.

$$Q=\alpha\cdot A\cdot(\Delta P/\rho)^{0.5} \quad \text{Formula (1)}$$

“α” is a constant, “A” is a sectional area of the throttle, and “ρ” is a density of fluid.

In Formula (1), the constant “α” is specific for hydraulic circuit 100, and “ρ” is specific for a kind of fluid to be used.

The present structure is not limitative of a structure of hydraulic pressure regulation system 37. Any structure is acceptable if it can adjust differential pressure ΔP of motion switchover valve 32 between pressure P1 of delivery port 31*a* of hydraulic pump 31 and pressure P2 of the suction port of boom cylinder 22 to the predetermined value.

Referring to FIG. 2, a structure of fluid supply circuit 47 will now be described.

Fluid supply circuit 47 supplements fluid circulating in hydraulic circuit 100.

As shown in FIG. 2, fluid supply circuit 47 mainly includes a hydraulic pump 48, a suction pipe 49, pipes 50, 51 and 52 and check valves 53 and 54.

Hydraulic pump 48 delivers fluid from fluid supply circuit 47. Hydraulic pump 48 is driven by engine 15 serving as the drive source.

Hydraulic pump 48 includes a delivery port 48*a*, serving as an opening for delivering fluid, and a suction port 48*b*, serving as an opening for sucking fluid.

Suction pipe 49 is connected at one end thereof to suction port 48*b* of hydraulic pump 48, and is disposed at the other end thereof in fluid tank 46.

Pipe 50 is connected at one end thereof to delivery port 48*a* of hydraulic pump 48, and is connected at the other end thereof to one end of pipe 51 and one end pipe 52.

Pipe 51 is connected at one end thereof to the other end of pipe 50, and is connected at the other end thereof to an intermediate portion of pipe 34.

Pipe 52 is connected at one end thereof to the other end of pipe 50, and is connected at the other end thereof to an intermediate portion of pipe 35.

Check valve 53 is disposed on an intermediate portion of pipe 51, so as to be opened only when the pressure on one side of check valve 53 toward delivery port 48*a* of hydraulic pump 48 is higher than the pressure on the other side of check valve 53 toward cylinder port 22*a* of boom cylinder 22.

Check valve 54 is disposed on an intermediate portion of pipe 52, so as to be opened only when the pressure on one side of check valve 54 toward delivery port 48*a* of hydraulic pump 48 is higher than the pressure on the other side of check valve 54 toward cylinder port 22*b* of boom cylinder 22.

Referring to FIG. 2, actuation processes of fluid supply circuit 47 will now be described.

When fluid circulating in hydraulic circuit 100 becomes insufficient, normally, the pressure of cylinder port 22*a* or 22*b* of boom cylinder 22 (pressure of pipe 34 or 35) is reduced.

Meanwhile, hydraulic pump 48 delivers fluid so as to keep a certain value of pressure of delivery port 48*a* on one side of check valves 53 and 54 (actually, a relief valve to be opened by the certain value of pressure is provided on an intermediate portion of pipe 50, and a pipe is provided so as to return fluid drained from the relief valve to fluid tank 46, thereby ensuring this effect).

Therefore, when the pressure of cylinder port 22*a* of boom cylinder 22 becomes not more than the certain value, check vale 53 is opened so that fluid having stored in fluid tank 46 is supplied to pipe 34 through suction pipe 49, hydraulic pump 48 and pipes 50 and 51.

Similarly, when the pressure of cylinder port 22*b* of boom cylinder 22 becomes not more than the certain value, check vale 54 is opened so that fluid having stored in fluid tank 46 is supplied to pipe 35 through suction pipe 49, hydraulic pump 48 and pipes 50 and 52.

Incidentally, the reason why the fluid circulating in hydraulic circuit 100 becomes insufficient is that boom cylinder 22 is a single-rod type hydraulic cylinder in which fluid flowing through cylinder port 22*a* and fluid flowing through cylinder port 22*b* have different quantities even though they are subjected to the common slide of the cylinder rod.

The present structure is not limitative of a structure of fluid supply circuit 47. Any structure is acceptable only if it can supplement fluid circulating in hydraulic circuit 100.

Referring to FIG. 2, a structure of connection system 55 will now be described.

Connection system 55 is disposed between boom cylinder 22 and motion switchover valve 32, so as to open one of the bottom and rod chambers having lower pressure to a fluid drain pipe 56. Fluid drain pipe 56 is connected at one end thereof to connection system 55, and is disposed at the other end thereof in fluid tank 46.

Connection system 55 mainly includes a connection switchover valve 57, pipes 58 and 59 and pilot pipes 60 and 61.

Connection switchover valve 57 is a pilot type switchover valve which switches a route of fluid flow therein based on the pressures in the bottom and rod chambers of boom cylinder 22.

In the present embodiment, connection switchover valve 57 includes three ports 57*a*, 57*b* and 57*c*, and is provided therein with a spool which is slidable to change a route of fluid flow in connection switchover valve 57 so as to selectively realize one of valve states α, β, and γ. In closed state α, all ports 57*a*, 57*b* and 57*c* are closed. In bottom-chamber opened state β, ports 57*a* and 57*b* are opened to each other and port 57*c* is closed. In rod-chamber opened state β, ports 57*a* and 57*c* are opened to each other and port 57*b* is closed.

The spool of connection switchover valve 57 is connected at opposite ends thereof to respective pilot pipes 60 and 61.

Pipe 58 connects port 57*b* to an intermediate portion of pipe 34. Pipe 59 connects port 57*c* to an intermediate portion of pipe 35.

Pilot pipe 60 connects one end of a spool operation part of connection switchover valve 57 to pipe 34.

Therefore, the pressure of pilot pipe 60 is substantially equal to the pressure of pipe 34, i.e., to the pressure of the bottom-chamber of boom cylinder 22.

Pilot pipe 61 connects the other end of the spool operation part of connection switchover valve 57 to pipe 35.

Therefore, the pressure of pilot pipe 61 is substantially equal to the pressure of pipe 35, i.e., to the pressure of the rod-chamber of boom cylinder 22.

When the bottom and rod chambers of boom cylinder 22 have substantially equal pressures, connection switchover valve 57 is set in closed valve state α.

One of reasons why the bottom and rod chambers of boom cylinder 22 have substantially equal pressures is that working device 5 is free from load and boom cylinder 22 is stationary.

When the pressure of the bottom chamber of boom cylinder 22 is lower than that of the rod chamber of boom cylinder 22, connection switchover valve 57 is set in bottom-chamber opened state β, so that the fluid having been filled in the bottom chamber of boom cylinder 22 is returned to fluid tank 46 through pipes 34 and 58, connection switchover valve 57 and fluid drain pipe 56.

Figure 7:
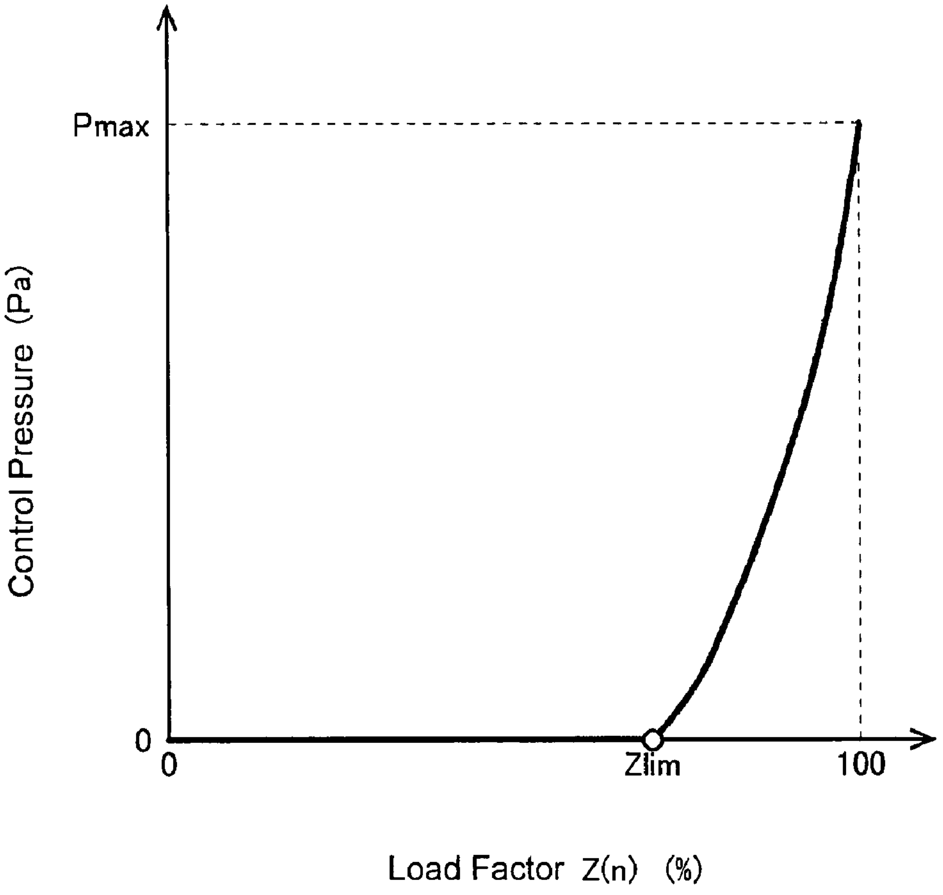
FIG. 7 is a diagram of the hydraulic circuit when a boom cylinder is contracted during normal excavation work.

One exemplar case causing the state where the pressure of the bottom chamber of boom cylinder 22 becomes lower than that of the rod chamber of boom cylinder 22 is that boom cylinder 22 is contracted during normal excavation work, e.g., when bucket 16 ditches or levels a hill. Therefore, a state as shown in FIG. 7 is realized so that the fluid having been filled in the bottom chamber is returned to fluid tank 46 through connection switchover valve 57 and fluid drain pipe 56.

Figure 3:
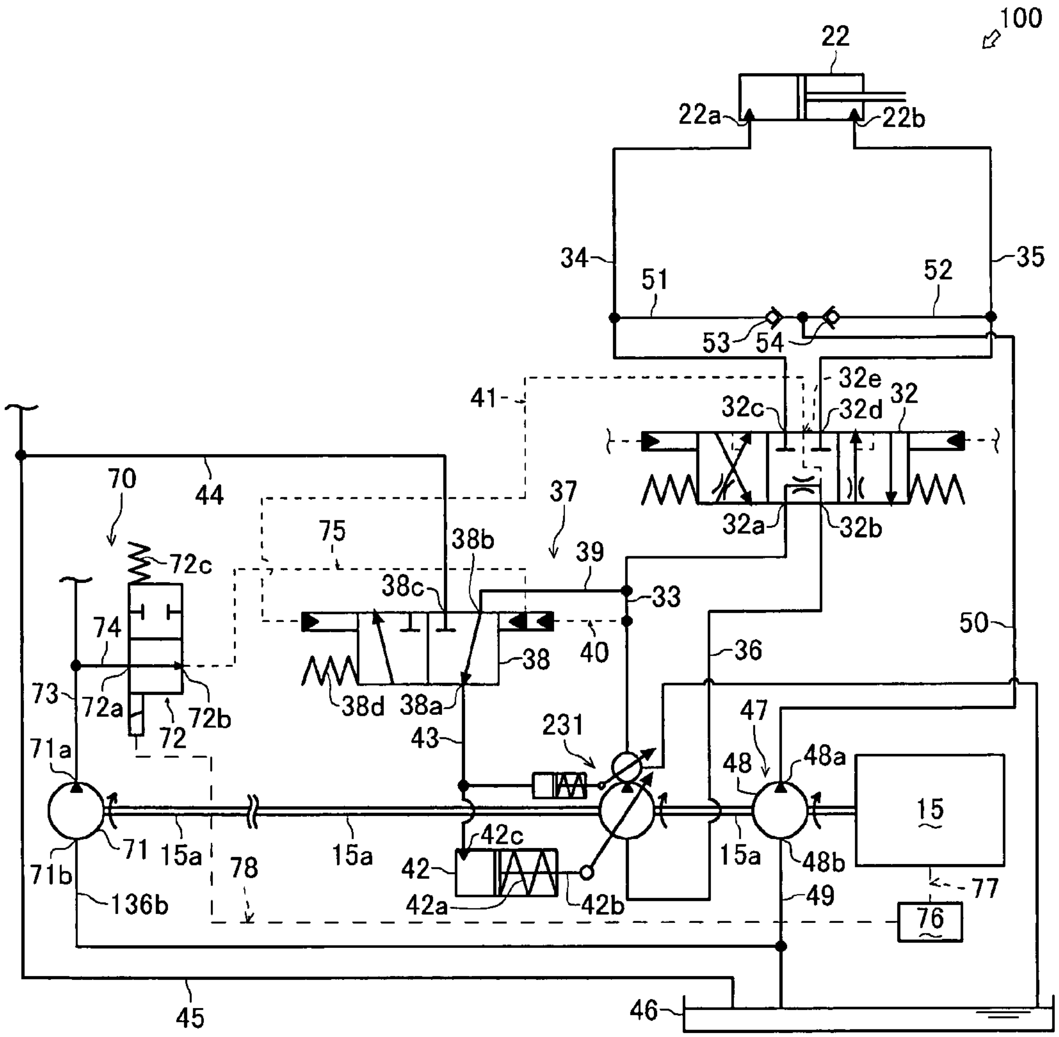
FIG. 3 is a left side view of the backhoe during maintenance work.
Figure 8:
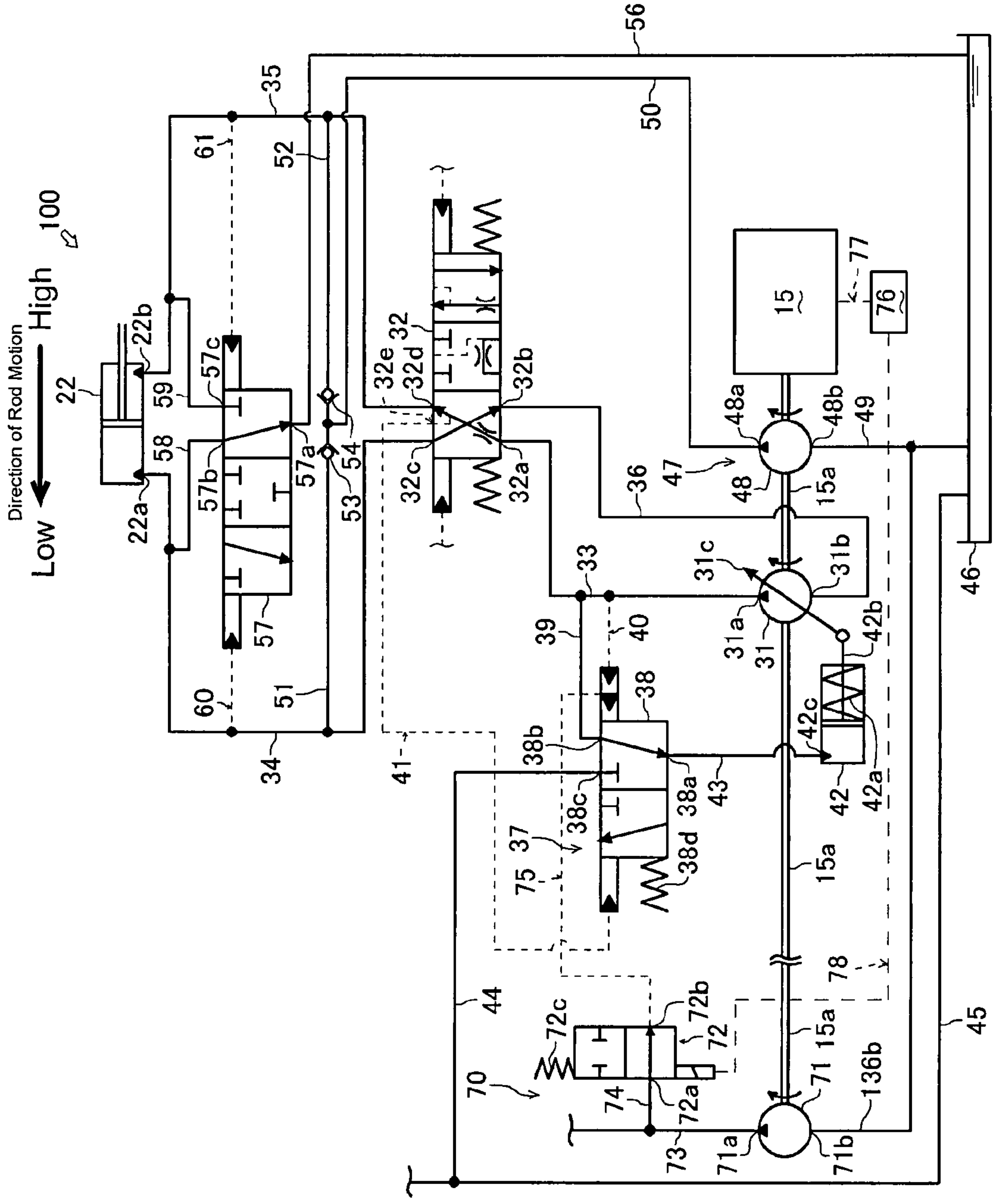
FIG. 8 is a diagram of the hydraulic circuit when the boom cylinder is extended during maintenance work.

Another exemplar case causing the above state is that boom cylinder 22 is extended during maintenance work, e.g., when backhoe 1 is lowered across a step as shown in FIG. 3, or when the bucket is rotated laterally and one side crawler is raised and lowered. In this case, since fluid to be supplied to the bottom chamber is required more than fluid to be drained from the rod chamber, a state as shown in FIG. 8 is realized so as to supply the shortage to the bottom chamber through pipe 50, check valve 53 and pipes 51 and 34.

When the pressure of the rod chamber of boom cylinder 22 is lower than that of the bottom chamber of boom cylinder 22, connection switchover valve 57 is set in rod-chamber opened state γ, so that the fluid having been filled in the rod chamber of boom cylinder 22 is returned to fluid tank 46 through pipes 35 and 59, connection switchover valve 57 and fluid drain pipe 56.

Figure 9:
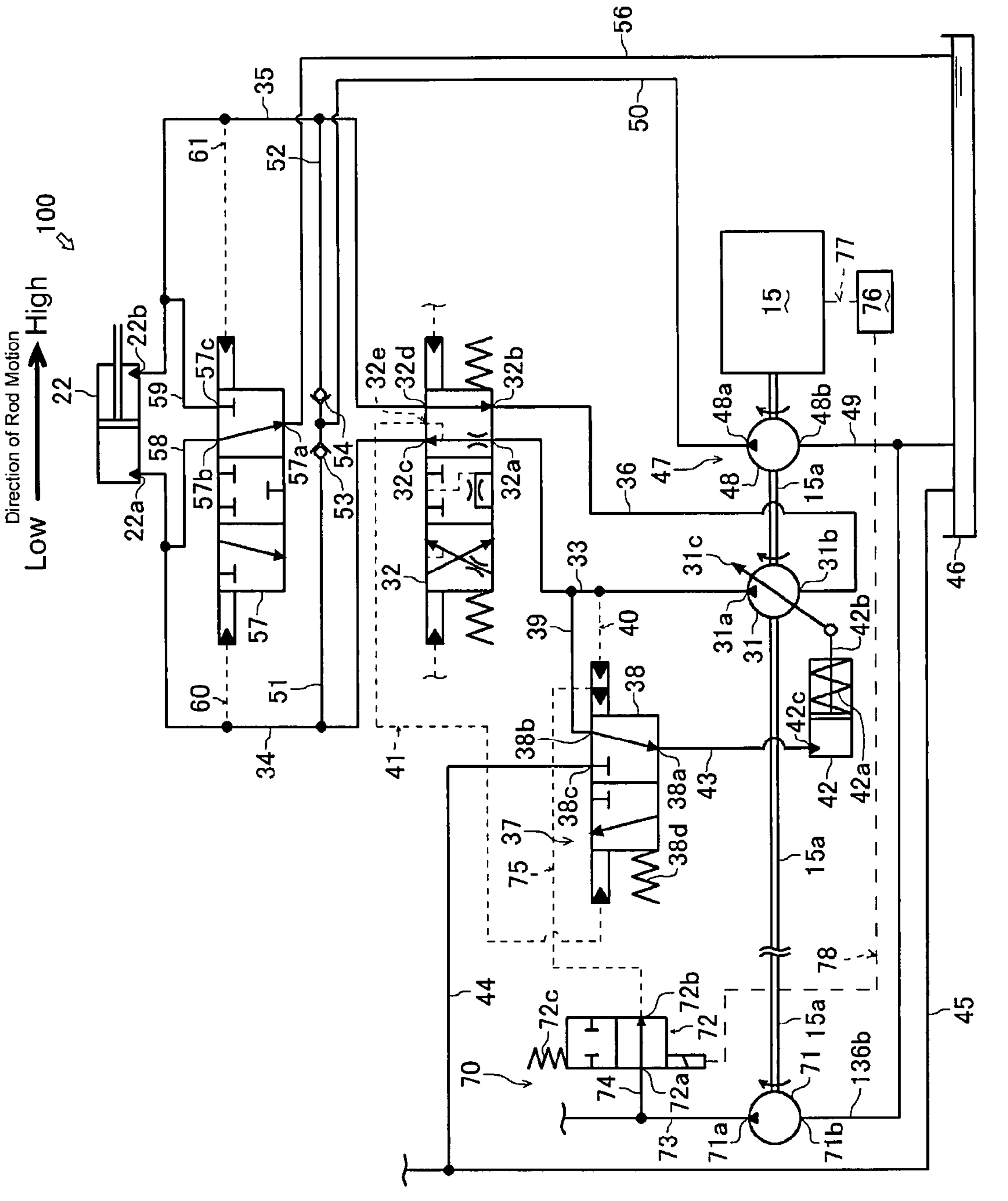
FIG. 9 is a diagram of the hydraulic circuit when the boom cylinder is extended during normal excavation work.

One exemplar case causing the state where the pressure of the rod chamber of boom cylinder 22 becomes lower than that of the bottom chamber of boom cylinder 22 is that boom cylinder 22 is extended for raising during normal excavation work. Since the fluid drained from the rod chamber is insufficient to be supplied to the bottom chamber, a state as shown in FIG. 9 is realized so as to supply the shortage to pipe 35 through pipe 50, check valve 54 and pipe 52.

Figure 10:
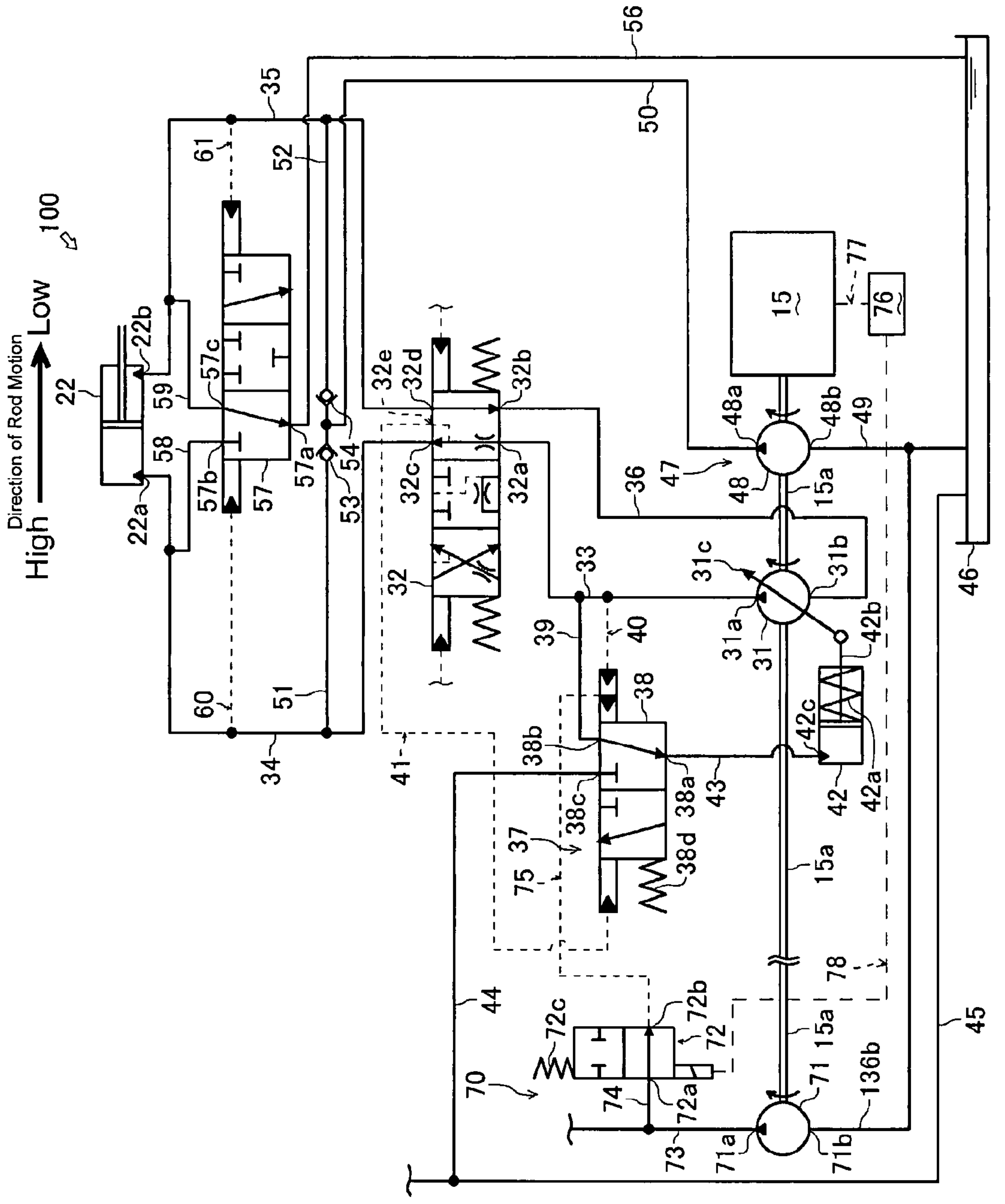
FIG. 10 is a diagram of the hydraulic circuit when the boom cylinder is contracted during maintenance work.

Another exemplar case causing the above state is that boom cylinder 22 is contracted for lowering boom 18. In this case, connection switchover valve 57 is set as shown in FIG. 10 so as to drain the surplus of fluid through pipes 35 and 59, connection switchover valve 57 and pipe 56.

The above-mentioned actuation of connection switchover valve 55 has the following effects.

Since boom cylinder 22 is the single-rod type hydraulic cylinder, the quantity of fluid passing cylinder port 22*a* is different from that passing cylinder port 22*b*. On the other hand, since the fluid is not compressive (i.e., the fluid has constant density regardless of time and place), hydraulic pump 31 has substantially equal suction and delivery quantities of fluid at any time during a motion thereof.

Consequently, no problem exists in the conventional case where fluid drained from the hydraulic cylinder is retuned to the fluid tank and then the hydraulic pump sucks fluid from the fluid tank. However, in the present case where fluid drained from boom cylinder 22 is not returned to the fluid tank but is directly supplied to the hydraulic pump through recovery pipe 36, fluid is unevenly distributed in hydraulic circuit 100 so as to increase unbalance of pressure in hydraulic circuit 100.

Due to the present embodiment, hydraulic circuit 100 is provided with connection system 55, which drains a part of fluid circulating in hydraulic circuit 100 outward from hydraulic circuit 100 and supplies the shortage of fluid through pipe 53 or 54, so as to prevent fluid from being unevenly distributed in hydraulic circuit 100.

The present structure is not limitative of a structure of connection system 55. Any structure can be employed as connection system 55 if it can connect the lower-pressurized one of the bottom and rod chambers to fluid supply circuit 47 or fluid drain pipe 56.

Figure 11:
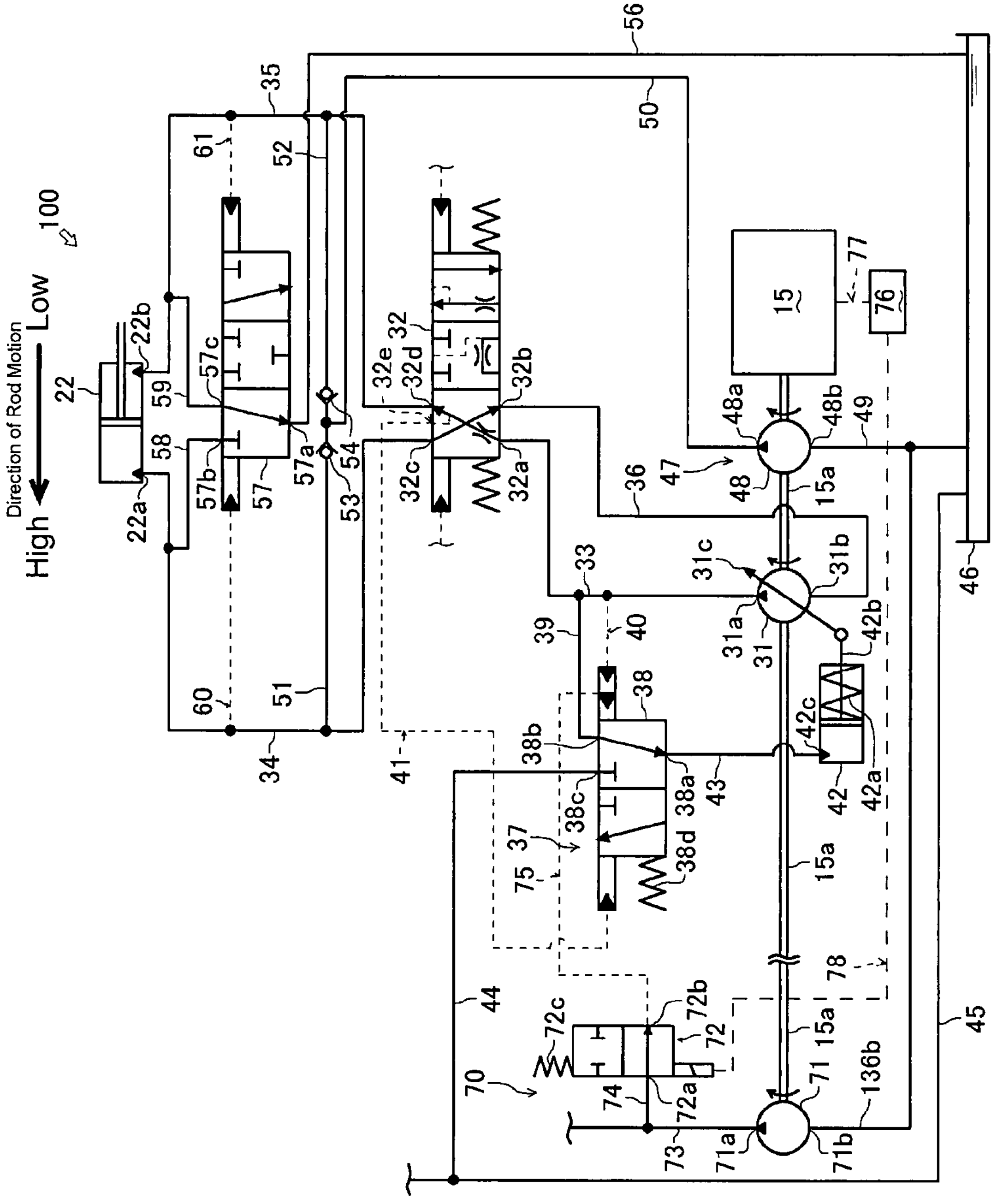
FIG. 11 is a diagram of a hydraulic circuit according to another embodiment of the invention.

Alternatively, as shown in FIG. 11, hydraulic circuit 100 may be provided with a dissymmetric hydraulic pump 231 so as to omit connection system 55. Hydraulic pump 231 is provided with a third port in addition to the normal suction and delivery ports, so that fluid can be sucked from the suction and third ports and delivered from the delivery port, or that fluid can be delivered from the delivery and third ports and sucked from the suction port.

As mentioned above, hydraulic circuit 100 of the present embodiment comprises boom cylinder 22, hydraulic pump 31, motion switchover valve 32, hydraulic pressure regulation system 37 and recovery pipe 36. Hydraulic pump 31 is driven by engine 15 so as to deliver fluid to boom cylinder 22. Motion switchover valve 32 is disposed between boom cylinder 22 and hydraulic pump 31 so as to switch the motion of boom cylinder 22. Hydraulic pressure regulation system 37 adjusts the differential pressure of motion switchover valve 32 between pressure P1 of delivery port 31*a* of hydraulic pump 31 and pressure P2 of the suction port of boom cylinder 22 to the predetermined value. Recovery pipe 36 supplies hydraulic pump 31 with fluid from motion switchover valve 32 to which the fluid is drained from the drain port of boom cylinder 22.

Due to this structure, hydraulic pump 31 is supplied with fluid "delivered" from boom cylinder 22 through recovery pipe 36.

Consequently, hydraulic pump 31 serves as a motor driven by the high-pressure fluid so as to bear a part or the whole of driving of a hydraulic pump 131 for supplying fluid to hydraulic actuators 13, 20, 21, 62, 63 and 64 in a later-discussed hydraulic circuit 200.

Accordingly, while the common engine drives hydraulic pumps 31 and 131 of respective hydraulic circuits 100 and 200, the driving load of hydraulic pump 131 is lightened by the motor action of hydraulic pump 31, thereby reducing the whole work done of the engine, and thereby reducing consumption of fuel.

In other words, due to such a simple structure, a part of energy (kinetic energy and potential energy) of fluid returned from boom cylinder 22 can be recovered so as to serve as power for driving the hydraulic pump.

Further, hydraulic circuit 100 can move the hydraulic cylinder actuated by fluid delivered from hydraulic pump 31 at a substantially constant speed regardless of variation of load.

Hydraulic circuit 100, having the single-rod type hydraulic boom cylinder 22, is further provided with the connection system, which is disposed between boom cylinder 22 and motion switchover valve 32 so as to connect the lower-pressurized one of the bottom and rod chambers of boom cylinder 22 to fluid drain pipe 56.

Due to this structure, even while boom cylinder 22 is the single-rod type hydraulic cylinder, hydraulic circuit 100 prevents fluid flow from being evenly distributed therein.

Referring to FIG. 2, a structure of hydraulic circuit 200 will be described.

In addition to hydraulic circuit 100, hydraulic circuit 200 is provided to backhoe 1. As shown in FIG. 2, hydraulic circuit 200 mainly includes blade cylinder 13, bucket cylinder 20, arm cylinder 21, a swiveling motor 62, a left traveling motor 63, a right traveling motor 64, hydraulic pump 131, suction pipes 136*a* and 136*b*, motion switchover valve unit 132, a delivery pipe 133, pipes 134*a*, 134*b*, 134*c*, 134*d*, 134*e* and 134*f*, pipes 135*a*, 135*b*, 135*c*, 135*d*, 135*e* and 135*f*, a hydraulic pressure regulation system 137 and a delivery restriction system 70.

The hydraulic actuators, actuated by hydraulic pressure, referred to in the present application, include the hydraulic cylinders, including blade cylinder, 13, bucket cylinder 20 and arm cylinder 21, and the hydraulic motors, including swiveling motor 62, left traveling motor 63 and right traveling motor 64.

As mentioned above, blade cylinder 13 is a hydraulic cylinder for vertically rotating blade 12.

A cylinder member of blade cylinder 13 is provided on an outer peripheral surface thereof with a cylinder port 13*a*, serving as an opening between a bottom chamber therein and the outside, and with a cylinder port 13*b*, serving as an opening between a rod chamber therein and the outside.

As mentioned above, bucket cylinder 20 is a hydraulic cylinder for rotating bucket 16 relative to arm 17.

A cylinder member of bucket cylinder 20 is provided on an outer peripheral surface thereof with a cylinder port 20*a*, serving as an opening between a bottom chamber therein and the outside, and with a cylinder port 20*b*, serving as an opening between a rod chamber therein and the outside.

As mentioned above, arm cylinder 21 is a hydraulic cylinder for rotating arm 17 relative to boom 18.

A cylinder member of bucket cylinder 21 is provided on an outer peripheral surface thereof with a cylinder port 21*a*, serving as an opening between a bottom chamber therein and the outside, and with a cylinder port 21*b*, serving as an opening between a rod chamber therein and the outside.

A swiveling motor 62 is a hydraulic motor for rotating swivel frame 3 relative to crawler-traveling device 2.

Swiveling motor 62 is provided with two ports 62*a* and 62*b*. The rotational direction of swivel frame 3 can be determined depending on which of ports 62*a* and 62*b* fluid is supplied to.

Left traveling motor 63 is a hydraulic motor provided on crawler-traveling device 2 so as to rotate crawler 11 on the left side of backhoe 1.

Left traveling motor 63 is provided with two ports 63*a* and 63*b*. The rotational direction of left crawler 11 of backhoe 1 can be determined depending on which of ports 63*a* and 63*b* fluid is supplied to.

Right traveling motor 64 is a hydraulic motor provided on crawler-traveling device 2 so as to rotate crawler 11 on the right side of backhoe 1.

Right traveling motor 64 is provided with two ports 64*a* and 64*b*. The rotational direction of right crawler 11 of backhoe 1 can be determined depending on which of ports 64*a* and 64*b* fluid is supplied to.

Hydraulic pump 131 delivers fluid to blade cylinder 13, bucket cylinder 20, arm cylinder 21, swiveling motor 62, left traveling motor 63 and right traveling motor 64. Hydraulic pump 131 is driven by engine 15 serving as the drive source.

In the present embodiment, hydraulic pump 131 includes a delivery port 131*a*, serving as an opening for delivering fluid, and a suction port 131*b*, serving as an opening for sucking fluid.

Hydraulic pump 131 is a swash plate type axial piston pump provided with a swash plate 131*c* rotatably fitted to a casing so that an angle of a surface of swash plate 131*c* from the axial line of rotary shaft 15*a* can be changed to change the delivery quantity of fluid thereof per one rotation of rotary shaft 15*a*, i.e., to change the delivery quantity of fluid per unit time.

Suction pipe 136*a* is connected at one end thereof to suction port 131*b* of hydraulic pump 131, and is connected at the other end thereof to an intermediate portion of suction pipe 136*b*.

Suction pipe 136*b* is connected at one end thereof to suction port 71*b* of hydraulic pump 71, and is disposed at the other end thereof in fluid tank 46.

In the present embodiment, motion switchover valve unit 132 serves as a group including motion switchover valves 201, 202, 203, 204, 205 and 206, having respective structures similar to the structure of motion switchover valve 32, so as to switch motions of blade cylinder 13, bucket cylinder 20, arm cylinder 21, swiveling motor 62, left traveling motor 63 and right traveling motor 64, respectively.

Motion switchover valves 201, 202, 203, 204, 205 and 206 are provided therein with respective spools whose slide degrees are controlled by operating respective levers (not shown) provided in cabin 4.

Delivery pipe 133 is connected at one end thereof to delivery port 131*a* of hydraulic pump 131, and is divided and connected at the other end thereof to respective motion switchover valves 201, 202, 203, 204, 205 and 206.

Fluid delivered from hydraulic pump 131 is supplied through delivery pipe 133 to motion switchover valves 201, 202, 203, 204, 205 and 206 constituting motion switchover valve unit 132.

Pipe 134*a* connects motion switchover valve 201 to cylinder port 13*a* on the bottom chamber side of blade cylinder 13.

Pipe 135*a* connects motion switchover valve 201 to cylinder port 13*b* on the rod chamber side of blade cylinder 13.

Pipe 134*b* connects motion switchover valve 202 to cylinder port 20*a* on the bottom chamber side of bucket cylinder 20.

Pipe 135*b* connects motion switchover valve 202 to cylinder port 20*b* on the rod chamber side of bucket cylinder 20.

Pipe 134*c* connects motion switchover valve 203 to cylinder port 21*a* on the bottom chamber side of arm cylinder 21.

Pipe 135*c* connects motion switchover valve 203 to cylinder port 21*b* on the rod chamber side of arm cylinder 21.

Pipe 134*d* connects motion switchover valve 204 to one cylinder port 62*a* of swiveling motor 62.

Pipe 135*d* connects motion switchover valve 204 to the other cylinder port 62*b* of swiveling motor 62.

Pipe 134*e* connects motion switchover valve 205 to one cylinder port 63*a* of left traveling motor 63.

Pipe 135*e* connects motion switchover valve 205 to the other cylinder port 63*b* of left traveling motor 63.

Pipe 134*f* connects motion switchover valve 206 to one cylinder port 64*a* of right traveling motor 64.

Pipe 135*f* connects motion switchover valve 206 to the other cylinder port 64*b* of right traveling motor 64.

As mentioned above, return pipe 45 is connected at one end thereof to motion switchover valve unit 132 (strictly, respective motion switchover valves 201, 202, 203, 204, 205 and 206), and is disposed at the other end thereof in fluid tank 46.

Fluid delivered from hydraulic pump 131 is supplied through the delivery pipe to respective motion switchover valves 201, 202, 203, 204, 205 and 206 constituting motion switchover valve unit 132.

A relation of actuation of blade cylinder 13 to states of motion switchover valve 201 will now be described.

When motion switchover valve 201 is set in a neutral state, in motion switchover valve 201, delivery pipe 133 and return pipe 45 are opened to each other, and pipes 134*a* and 135*a* are closed at ends thereof toward motion switchover valve 201.

Therefore, hydraulic pump 131 sucks fluid from fluid tank 46 through suction pipes 136*b* and 136*a*, and fluid delivered from hydraulic pump 131 is returned to fluid tank 46 through delivery pipe 133, motion switchover valve 201 and return pipe 45. Fluid filled in the bottom and rod chambers of blade cylinder 13 is kept.

Consequently, the projection degree of the cylinder rod of blade cylinder 13 from the cylinder member thereof is kept, i.e.,. the length of blade cylinder 13 is kept.

When motion switchover valve 201 is set in a cylinder-extension state, in motion switchover valve 201, delivery pipe 133 and pipe 134*a* are opened to each other, and pipe 135*a* and return pipe 45 are opened to each other.

Therefore, hydraulic pump 131 sucks fluid from fluid tank 46 through suction pipes 136*b* and 136*a*, and fluid delivered from hydraulic pump 131 is supplied to the bottom chamber of blade cylinder 13 through delivery pipe 133, motion switchover valve 201 and pipe 134*a*. Simultaneously, fluid having been filled in the rod chamber of blade cylinder 13 is returned to fluid tank 46 through pipe 135*a*, motion switchover valve 201 and return pipe 45.

Consequently, the cylinder rod of blade cylinder 13 is thrust out from the cylinder member thereof, i.e., blade cylinder 13 is extended.

When motion switchover valve 201 is set in a cylinder-contraction state, in motion switchover valve 201, delivery pipe 133 and pipe 135*a* are opened to each other, and pipe 134*a* and return pipe 45 are opened to each other.

Therefore, hydraulic pump 131 sucks fluid from fluid tank 46 through suction pipes 136*b* and 136*a*, and fluid delivered from hydraulic pump 131 is supplied to the rod chamber of blade cylinder 13 through delivery pipe 133, motion switchover valve 201 and pipe 135*a*. Simultaneously, fluid having been filled in the bottom chamber of blade cylinder 13 is returned to fluid tank 46 through pipe 134*a*, motion switchover valve 201 and return pipe 45.

Consequently, the cylinder rod of blade cylinder 13 is withdrawn into the cylinder thereof, i.e., blade cylinder 13 is contracted.

A relation of actuation of bucket cylinder 20 to states of motion switchover valve 202 and a relation of actuation of arm cylinder 21 to states of motion switchover valve 203 are substantially similar to the relation of actuation of blade cylinder 13 to the states of motion switchover valve 201.

A relation of actuation of swiveling motor 62 to states of motion switchover valve 204 will now be described.

When motion switchover valve 204 is set in a neutral state, in motion switchover valve 204, delivery pipe 133 and return pipe 45 are opened to each other, and pipes 134*d* and 135*d* are closed at ends thereof toward motion switchover valve 204.

Therefore, hydraulic pump 131 sucks fluid from fluid tank 46 through suction pipes 136*b* and 136*a*, and fluid delivered from hydraulic pump 131 is returned to fluid tank 46 through delivery pipe 133, motion switchover valve 204 and return pipe 45. Fluid filled in swiveling motor 62 is kept.

Consequently, the rotary shaft of swiveling motor 62 is kept, i.e., the turn angle of swivel frame 3 relative to crawler-traveling device 2 is kept.

When motion switchover valve 204 is set in a left-turning state, in motion switchover valve 204, delivery pipe 133 and pipe 134*d* are opened to each other, and pipe 135*d* and return pipe 45 are opened to each other.

Therefore, hydraulic pump 131 sucks fluid from fluid tank 46 through suction pipes 136*b* and 136*a*, and fluid delivered from hydraulic pump 131 is supplied to port 62*a* of swiveling motor 62 through delivery pipe 133, motion switchover valve 204 and pipe 134*d*. Simultaneously, fluid is drained from port 62*b* of swiveling motor 62, and is returned to fluid tank 46 through pipe 135*d*, motion switchover valve 204 and return pipe 45.

Consequently, swiveling motor 62 drives to rotate swivel frame 3 leftward (counterclockwise in plan view) relative to crawler-traveling device 2.

When motion switchover valve 204 is set in a right-turning state, in motion switchover valve 204, delivery pipe 133 and pipe 135*d* are opened to each other, and pipe 134*d* and return pipe 45 are opened to each other.

Therefore, hydraulic pump 131 sucks fluid from fluid tank 46 through suction pipes 136*b* and 136*a*, and fluid delivered from hydraulic pump 131 is supplied to port 62*b* of swiveling motor 62 through delivery pipe 133, motion switchover valve 204 and pipe 135*d*. Simultaneously, fluid is drained from port 62*a* of swiveling motor 62, and is returned to fluid tank 46 through pipe 134*d*, motion switchover valve 204 and return pipe 45.

Consequently, swiveling motor 62 drives to rotate swivel frame 3 rightward (clockwise in plan view) relative to crawler-traveling device 2.

A relation of actuation of left traveling motor 63 to states of motion switchover valve 205 and a relation of actuation of right traveling motor 64 to states of motion switchover valve 206 are substantially similar to the relation of actuation of swiveling motor 62 to the states of motion switchover valve 204.

Referring to FIG. 2, a hydraulic pressure regulation system 137 will now be described.

Hydraulic pressure regulation system 137 includes a pressure regulation valve 138, a pipe 139, pilot pipes 140 and 141, a regulating cylinder 142, a pipe 143 and a return pipe 44*a*. The respective elements of hydraulic pressure regulation system 137, including spring 142*a*, cylinder rod 142*b*, cylinder port 142*c*, ports 138*a*, 138*b*, and 138*c*, and spring 138*d*, are basically similar in structure and actuation to the corresponding elements of hydraulic pressure regulation system 37.

The distinctive point of hydraulic pressure regulation system 137 to hydraulic pressure regulation system 37 is that hydraulic pressure regulation system 137 has only the single pressure regulation valve 138 for motion switchover valve unit 132 including six motion switchover valves 201, 202, 203, 204, 205 and 206.

More specifically, a pressure of pilot pipe 141 becomes substantially equal to the highest pressure of pressures of the respective suction ports of blade cylinder 13, bucket cylinder 20, arm cylinder 21, swiveling motor 62, left traveling motor 63 and right traveling motor 64.

Consequently, hydraulic pressure regulation system 137 adjusts a differential pressure of motion switchover valve unit 132 between a pressure of delivery port 131*a* of hydraulic pump 131 and the highest one of pressures of the respective suction ports of blade cylinder 13, bucket cylinder 20, arm cylinder 21, swiveling motor 62, left traveling motor 63 and right traveling motor 64 to a predetermined value.

Referring to FIGS. 2, 4, 5 and 6, delivery restriction system 70 will now be described.

Delivery restriction system 70 restricts the delivery quantity of fluid from the hydraulic pump driven by engine 15 serving as the drive source (in the present embodiment, hydraulic pumps 31 and 131 serving as main load on engine 15) when load on engine 15 becomes not less than a predetermined value.

In the present embodiment, delivery restriction system 70 mainly includes a hydraulic pump 71, a pressure regulation valve 72, pipes 73 and 74, a pilot pipe 75, a controller 76 and wires 77 and 78.

Referring to FIGS. 2, 4, 5 and 6, a structure of delivery restriction system 70 will now be described.

Hydraulic pump 71 is driven by engine 15 serving as the drive source so as to deliver fluid.

Hydraulic pump 71 is provided with a delivery port 71*a*, serving as an opening for delivering fluid, and with a suction port 71*b*, serving as an opening for sucking fluid. Suction pipe 136*b* is connected at one end thereof to suction port 71*b*.

Pressure regulation valve 72 is a solenoid type electromagnetic proportional valve controlling hydraulic pressure in pilot pipe 75 based on a signal from later-discussed controller 76.

Pressure regulation valve 72 includes two ports 72*a* and 72*b*, and slides a spool therein according to a command signal from controller 76 so as to change a flow area of fluid passing in pressure regulation valve 72, thereby regulating hydraulic pressure in pilot pipe 75.

Pressure regulation valve 72 is provided with a spring 72*c*, which biases the spool so as to close pressure regulation valve 72, so that a pressure is prevented from being applied to pilot pipe 75 in a normal state (when no signal is issued from controller 76).

Pipe 73 is connected at one end thereof to delivery port 71 a of hydraulic pump 71, and is connected at the other end thereof to another hydraulic actuator (not shown) or the like.

Pipe 74 connects an intermediate portion of pipe 73 to port 72*a* of pressure regulation valve 72.

Pilot pipe 75 is connected at one end thereof to port 72*b* of pressure regulation valve 72, and is divided at an intermediate portion thereof so as to be connected at the other end thereof to one ends of the spools of respective pressure regulation valves 38 and 138, onto which pressure of pilot pipe 75 is applied in the direction for pushing the spools and setting valves 38 and 138 into a differential pressure restriction state (a).

Controller 76 issues the signal in correspondence to load on engine 15. Controller 76 may be CPUs, ROMs or RAMs interconnected with buses, or alternatively, it may comprise one-chip LSI. Further alternatively, controller 76 may be a simple sensor, which issues the signal only when it detects overload.

Alternatively, another control device of backhoe 1 for controlling another component member may have the function of controller 76, so as to omit controller 76.

Wire 77 connects engine 15 (strictly, load detection means provided on engine 15) to controller 76.

Wire 78 connects controller 76 to pressure regulation valve 72 (strictly, the solenoid of pressure regulation valve 72 for sliding the spool).

Alternatively, wire 77 may be provided for detecting the tilt angles of the swash plates of hydraulic pumps 31 and 131 so as to detect the delivery pressures and quantities of fluid from hydraulic pumps 31 and 131.

Figure 4:
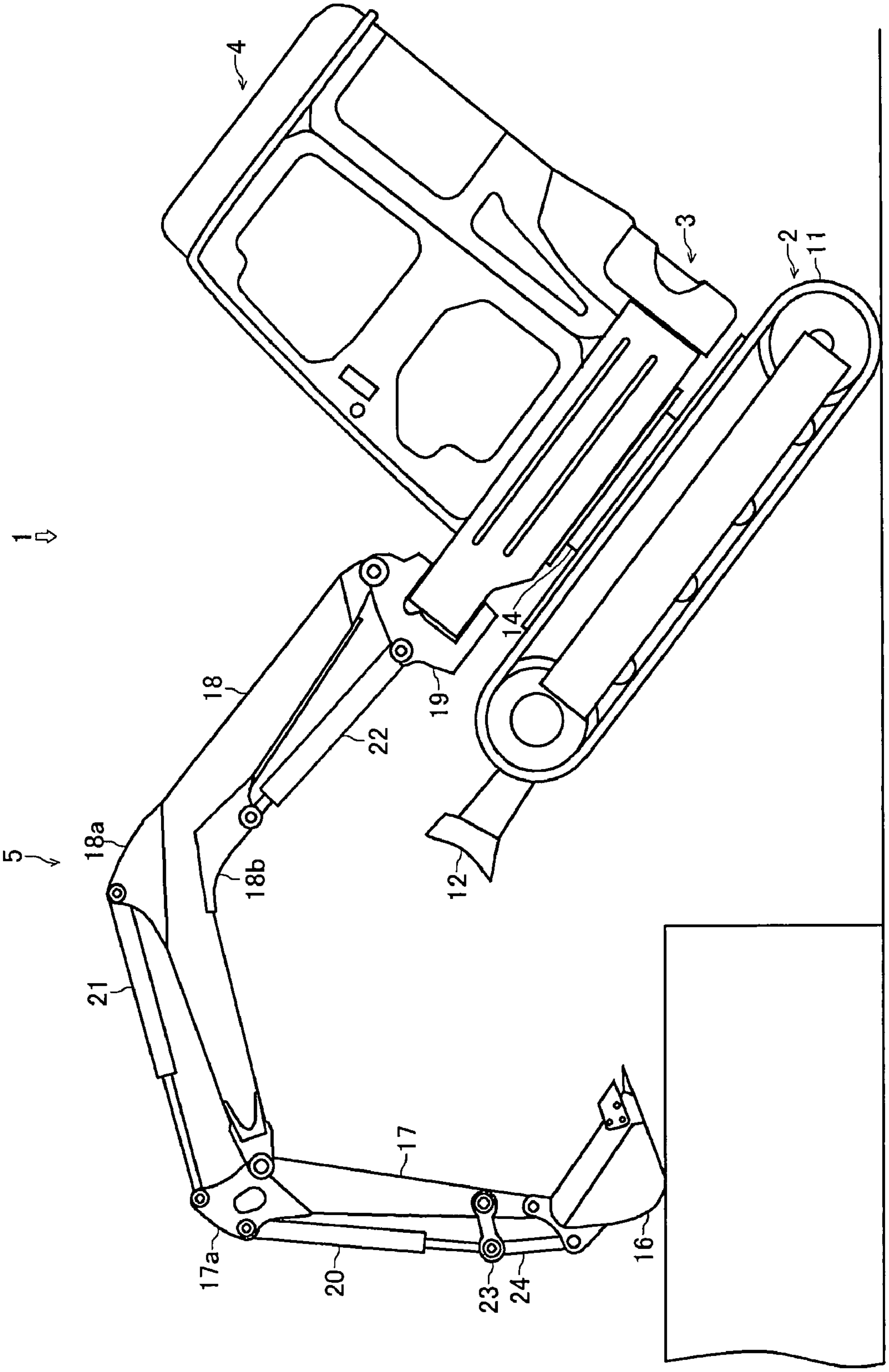
FIG. 4 is a chart of relation between engine rotary speed and torque.
Figure 5:
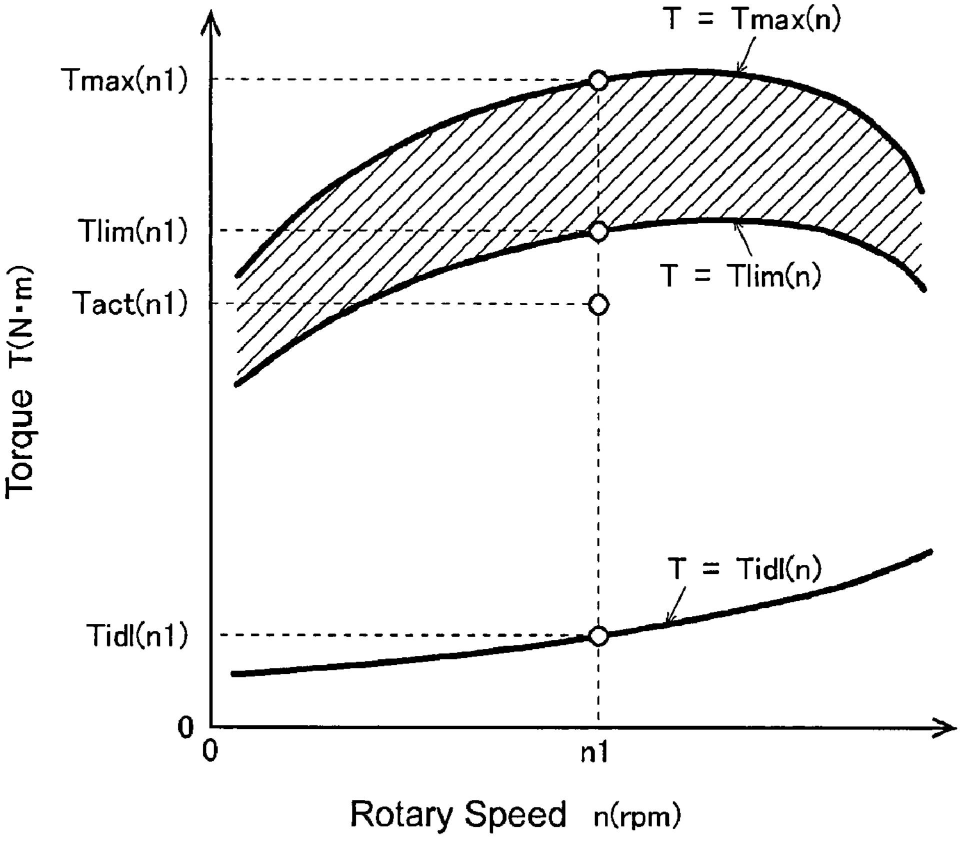
FIG. 5 is a chart of relation between engine rotary speed and control rack position.
Figure 6:
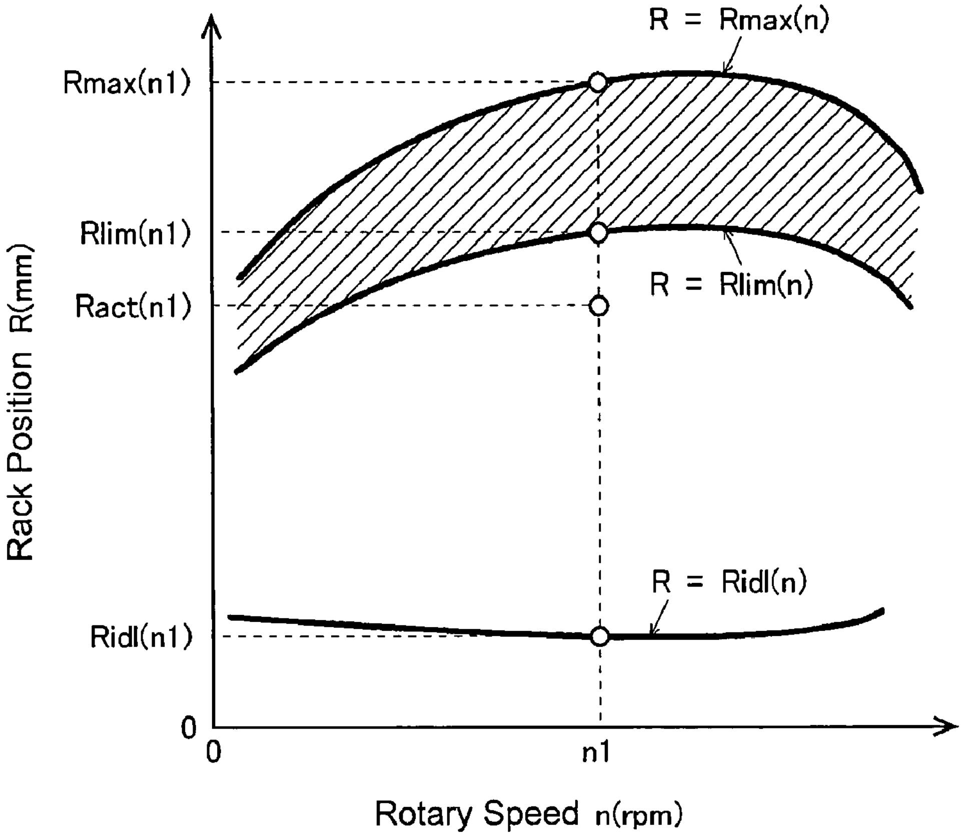
FIG. 6 is a chart of relation between engine load factor and pressure for controlling a restriction switchover valve.

Referring to FIGS. 4, 5 and 6, an embodiment of calculation of a load factor of engine 15 will now be described.

FIG. 4 is a chart of relation of torque T (N·m) of engine 15 to rotary speed n (rpm) of engine 15.

"T=Tmax(n)" in FIG. 4 is a formula indicating the maximum torque of engine 15 having any rotary speed. "T=Tidl (n)" in FIG. 4 is a formula indicating a torque of unloaded engine 15 having any rotary speed (in this embodiment, when both the surfaces of swash plates 31*c* and 131*c* of respective hydraulic pumps 31 and 131 are disposed perpendicular to rotary shaft 15*a*).

It is assumed that engine 15 having rotary speed "n" has a torque "Tact(n)". On this assumption, a formula (2) indicating a load factor Y(%) is as follows:

$$Y(n)=\{(Tact(n)-Tidl(n))/(Tmax(n)-Tidl(n))\}*100 \quad \text{Formula (2)}$$

To prevent overload on engine 15, a limit torque Tlim(n) is defined by use of a limit load factor Ylim(%). Then, the following equation is realized.

$$Tlim(n)=\{Tidle(n)+(Tmax(n)-Tidl(n))\cdot Ylim/100\}$$

The torque of engine 15 can be directly detected by a sensor or the like.

However, in the present invention, on the assumption that engine 15 is a diesel engine having a fuel injection pump, a rack position R(mm) of a control rack for controlling the injection quantity of fuel from the fuel injection pump is detected as a characteristic substituting-for the torque, so as to calculate a load factor Z(%).

As shown in FIG. 5, rack position R is related to a quantity of fuel injected from the fuel injection pump on engine 15 at a time, i.e., to torque T of engine 15 (see FIG. 4), similar to the relation of rack position R to rotary speed n.

FIG. 5 is a chart of relation of rack position R(mm) of engine 15 to rotary speed n (rpm) of engine 15.

"R=Rmax(n)" in FIG. 5 is a formula indicating the maximum rack position of engine 15 having any rotary speed. "R=Ridl(n)" in FIG. 5 is a formula indicating a rack position of unloaded engine 15 having any rotary speed (in this embodiment, when both the surfaces of swash plates 31*c* and 131*c* of respective hydraulic pumps 31 and 131 are disposed perpendicular to rotary shaft 15*a*).

It is assumed that engine 15 having rotary speed "n" has a rack position "Ract(n)". On this assumption, a formula (3) indicating a load factor Z(%) is as follows:

$$Z(n)=\{(Ract(n)-Ridl(n))/(Rmax(n)-Ridl(n))\}*100 \quad \text{Formula (3)}$$

To prevent overload on engine 15, a limit rack position Rlim(n) is defined by use of a limit load factor Zlim(%). Then, the following equation is realized.

$$Rlim(n)=\{Ridle(n)+(Rmax(n)-Ridl(n))\cdot Zlim/100\}$$

Referring to FIGS. 2, 4, 5 and 6, actuation of delivery restriction system 70 will now be described.

In this embodiment, a position sensor for detecting rack position R(mm) of engine 15 and an engine rotary speed sensor for detecting the rotary speed of engine 15 serve as engine load detection means.

Controller 76 calculates load factor Z(n) based on rotary speed n and rack position R(n) of engine 15 detected by the engine load detection means. When Z(n) is equal to or more than Zlim(n), i.e., when rack position R(n) of engine 15 is disposed at or beyond limit rack position Rlim(n) (in a hatched range in FIG. 5), controller 76 recognizes engine 15 as being overloaded, and outputs the signal to pressure regulation valve 72.

Consequently, as shown in FIG. 2, hydraulic pump 71 sucks fluid from fluid tank 46 through suction pipe 136*b*, and fluid delivered from hydraulic pump 71 reaches the one ends of the spool operation parts of respective pressure regulation valves 38 and 138 through pipes 73 and 74, pressure regulation valve 72 and pilot pipe 75, so as to push both the spools in the direction for setting pressure regulation valves 38 and 138 into state (a), thereby restricting (i.e., reducing) the delivery quantities of fluid from hydraulic pumps 31 and 131.

In this way, the delivery quantities of fluid from hydraulic pumps 31 and 131 are restricted so as to reduce the load on engine 15.

As "{Z(n)-Zlim}" becomes large, controller 76 recognizes the large "{Z(n)-Zlim}" as a heavy overload on engine 15, and outputs the signal defined so as to increase the opening of pressure regulation valve 72. Consequently, as shown in FIG. 6, the control pressure, i.e., the pressure of pilot pipe 75, is increased.

In this embodiment, load factor Zlim of engine 15 is constant regardless of rotary speed N of engine 15. Alternatively, load factor Zlim may be variable in correspondence to engine rotary speed n.

For example, since the engine stalling is liable to occur when the engine rotary speed is small, the limit load factor set for a smaller engine rotary speed range may be smaller than that for a larger engine rotary speed range.

In this way, hydraulic circuit 200 comprises the plurality of hydraulic actuators, hydraulic pump 131, motion switchover valves 201, 202, 203, 204, 205 and 206, hydraulic pressure regulation system 137, and delivery restriction system 70. The plurality of -hydraulic actuators are blade cylinder 13, bucket cylinder 20, arm cylinder 21, swiveling motor 62, left traveling motor 63 and right traveling motor 64. Hydraulic pump 131 is driven by engine 15 so as to deliver fluid to the hydraulic actuators. Motion switchover valves 201, 202, 203, 204, 205 and 206 are disposed between hydraulic pump 131 and the respective hydraulic actuators so -as to switch motions of the respective hydraulic actuators. Hydraulic pressure regulation system 137 adjusts the differential pressure of motion switchover valves 201, 202, 203, 204, 205 and 206 between the pressure of the delivery port of hydraulic pump

131 and the pressure of the suction ports of the respective hydraulic actuators. Delivery restriction system 70 restricts the delivery quantities of fluid from hydraulic pumps 31 and 131 when load on engine 15 is not less than the predetermined value.

Due to this structure, the hydraulic actuators supplied with fluid delivered from hydraulic pump 131 can be moved at substantially constant speeds regardless of variation of load, and engine 15 can be prevented from being overloaded.

In the above-mentioned embodiment, hydraulic circuit 200 includes the plurality of hydraulic actuators. Alternatively, it may have only one hydraulic actuator.

Only one hydraulic pump 131 is provided to deliver fluid to the plurality of hydraulic actuators. Alternatively, a plurality of hydraulic pumps may be provided so as to supply fluid to the respective hydraulic actuators.

Only one hydraulic pressure regulation system 137 is provided to regulate pressures of the hydraulic actuators. Alternatively, a plurality of hydraulic pressure regulation systems may be provided for the respective hydraulic actuators.

Due to the above-mentioned hydraulic circuit 200, fluid drained from motion switchover valves 201, 202, 203, 204, 205 and 206 is returned to fluid tank 46 through return pipe 45. Alternatively, the fluid drained from motion switchover valves 201, 202, 203, 204, 205 and 206 may be directly supplied to hydraulic pump 131 through a recovery pipe.

The invention claimed is:

1. A hydraulic circuit comprising:

a first hydraulic actuator;

a first hydraulic pump driven by a drive source so as to deliver fluid to the first hydraulic actuator;

a motion switchover valve disposed between the first hydraulic actuator and the first hydraulic pump so as to switch a motion of the first hydraulic actuator;

a hydraulic pressure regulation system for adjusting a differential pressure of the motion switchover valve between a delivery port of the first hydraulic pump and a suction port of the first hydraulic actuator to a predetermined value;

at least one second hydraulic actuator;

a second hydraulic pump driven by the drive source so as to deliver fluid to the at least one second hydraulic actuator; and a recovery passage for supplying the first hydraulic pump with fluid from the motion switchover valve to which the fluid is returned from a drain port of the first hydraulic actuator, so that the second hydraulic pump is driven by the fluid from the recovery passage.

2. The hydraulic circuit according to claim 1, wherein the first hydraulic actuator is a single-rod type hydraulic cylinder, and wherein the hydraulic circuit further comprises a connection system disposed between the hydraulic cylinder and the motion switchover valve so as to connect lower-pressurized one of bottom and rod chambers of the hydraulic cylinder to a fluid supply circuit or a fluid drain pipe.

3. The hydraulic circuit according to claim 2, further comprising:

a delivery restriction system for restricting delivery quantities of the first and second hydraulic pumps when load on the drive source becomes not less than a predetermined value.

* * * * *

UNITED STATES PATENT AND TRADEMARK OFFICE

CERTIFICATE OF CORRECTION

PATENT NO. : 7,788,915 B2
APPLICATION NO. : 11/793543
DATED : September 7, 2010
INVENTOR(S) : Shiozaki et al.

It is certified that error appears in the above-identified patent and that said Letters Patent is hereby corrected as shown below:

In the drawings, Sheet 3, Figure 3, “Fig. 3” should read --Fig. 11--.

In the drawings, Sheet 4, Figure 4, “Fig. 4” should read --Fig. 3--.

In the drawings, Sheet 5, Figure 5, “Fig. 5” should read --Fig. 4--.

In the drawings, Sheet 6, Figure 6, “Fig. 6” should read --Fig. 5--.

In the drawings, Sheet 7, Figure 7, “Fig. 7” should read --Fig. 6--.

In the drawings, Sheet 8, Figure 8, “Fig. 8” should read --Fig. 7--.

In the drawings, Sheet 9, Figure 9, “Fig. 9” should read --Fig. 8--.

In the drawings, Sheet 10, Figure 10, “Fig. 10” should read --Fig. 9--.

In the drawings, Sheet 11, Figure 11, “Fig. 11” should read --Fig. 10--.

Signed and Sealed this
Twenty-fourth Day of May, 2011

David J. Kappos

David J. Kappos
*Director of the United States Patent and Trademark Office*